(12) United States Patent  
Winter

(10) Patent No.: US 9,342,799 B2  
(45) Date of Patent: May 17, 2016

(54) SYSTEM AND METHOD FOR OPTIMIZING BUSINESS INTELLIGENCE DATA QUERIES WITHIN A CLIENT-SERVER ARCHITECTURE

(75) Inventor: Stewart James Winter, Metcalfe (CA)

(73) Assignee: International Business Machines Corporation, Armonk, NY (US)

( * ) Notice: Subject to any disclaimer, the term of this patent is extended or adjusted under 35 U.S.C. 154(b) by 2721 days.

(21) Appl. No.: 11/973,003

(22) Filed: Oct. 4, 2007

(65) Prior Publication Data

US 2008/0189332 A1 Aug. 7, 2008

(30) Foreign Application Priority Data

Feb. 2, 2007 (CA) ..................................... 2576703

(51) Int. Cl.
*G06Q 20/12* (2012.01)
*G06Q 10/00* (2012.01)
*G06F 17/30* (2006.01)

(52) U.S. Cl.
CPC .......... *G06Q 10/00* (2013.01); *G06F 17/30471* (2013.01); *G06Q 20/1235* (2013.01)

(58) Field of Classification Search
CPC ................................................ G06Q 20/1235
USPC .......................................................... 705/50
See application file for complete search history.

(56) References Cited

U.S. PATENT DOCUMENTS

| 6,826,557 | B1 * | 11/2004 | Carter | G06F 17/30457 |
| 7,039,654 | B1 * | 5/2006 | Eder | G06Q 10/06 |
| 7,130,807 | B1 * | 10/2006 | Mikurak | G06Q 10/06 705/7.25 |
| 7,716,571 | B2 * | 5/2010 | Tien | G06Q 30/00 715/212 |
| 2003/0172020 | A1 * | 9/2003 | Davies | G06Q 40/06 705/36 R |
| 2004/0064351 | A1 * | 4/2004 | Mikurak | G06Q 10/087 705/22 |
| 2005/0154769 | A1 * | 7/2005 | Eckart | G06Q 40/04 |
| 2005/0209944 | A1 * | 9/2005 | Ballow | G06Q 10/0637 705/35 |
| 2006/0136354 | A1 * | 6/2006 | Bell | G06F 17/30592 |
| 2006/0184410 | A1 * | 8/2006 | Ramamurthy | G06Q 10/10 706/8 |
| 2007/0050340 | A1 * | 3/2007 | von Kaenel | G06F 17/30241 |
| 2007/0208690 | A1 * | 9/2007 | Schneider | G06F 17/30483 |
| 2008/0027769 | A1 * | 1/2008 | Eder | G06F 17/30864 705/7.28 |

OTHER PUBLICATIONS

Office Action mailed May 30, 2012 from the Canadian Intellectual Property Office received in corresponding CA Application Serial No. 2,576,703, 3 pgs.

* cited by examiner

*Primary Examiner* — Calvin L Hewitt, II
*Assistant Examiner* — Cristina Sherr
(74) *Attorney, Agent, or Firm* — Shumaker & Sieffert, P.A.

(57) ABSTRACT

Method and server in a business intelligence analysis system for building a response to a client request. The response includes information regarding the response in an updated server context. The updated server context is round tripped to the client and included in a subsequent request. After being received from the client, the subsequent request is optimized based on the included updated server context.

20 Claims, 10 Drawing Sheets

SYSTEM AND METHOD FOR OPTIMIZING BUSINESS INTELLIGENCE DATA QUERIES WITHIN A CLIENT-SERVER ARCHITECTURE

FIELD OF THE INVENTION

The present invention relates to business intelligence data queries, more specifically, the present invention relates to system and method for optimizing business intelligence data queries within a client-server architecture.

BACKGROUND OF THE INVENTION

Business decision makers often use business intelligence analytical software tool to pose operational performance questions as queries against their data sources. The business intelligence analytical tool is often implemented in a server-client architecture. The analytical tool often includes a client that provides a user interface, for example, a client browser; and a server that handles processing of queries and retrieval of data from data sources.

In order to analyze business performance, users often need to navigate through data in reports generated by the analytical tool. Each new request from the user results in a new response being sent to the client from the server and rendered in the browser. This causes significant interactions between the client and server. Each interaction between the client and server requires time to provide the requested information to the client and users may not be able to perform sufficient business performance analysis if these time periods exceed the expectations of a highly interactive environment.

It is therefore desirable to provide a mechanism for providing business intelligence information from the server to the client more efficiently.

SUMMARY OF THE INVENTION

It is an object of the invention to provide an improved system and method for optimizing business intelligence data delivery in a client-server architecture.

The invention according to an aspect provides a business intelligence analysis server in a client-server business intelligence analysis system comprising a query processing component receiving a request from a client in the client-server business intelligence analysis system; a query information collector capturing information in a response to the request, and including the information in an updated server context in the response; and an adaptive query optimizer for optimizing a subsequent request from the client, the subsequent request utilizing the optimization information included in the server context.

In accordance with another aspect of the present invention there is provided a method of processing a request from a client at a business intelligence analysis server, the method comprising the steps of: receiving the request; building a response to the request capturing information of the response in an updated server context, the updated server context forming part of the response to the request, dispatching the response to the client; including the updated server context in a subsequent request; receiving the subsequent request from the client; and optimizing the subsequent request, based on the included updated server context.

The invention according to another aspect provides a storage medium readable by a computer encoding a computer program for execution by the computer to carry out a method for processing a request from a client to a business intelligence analysis server, the computer program comprising: code means for receiving the request; code means for building a response to the request; code means for capturing information of the response in an updated server context, the updated server context forming part of the response to the request; code means for dispatching the response to the client; code means for including the updated server context in a subsequent request; code means for receiving the subsequent request from the client; and code means for optimizing the subsequent request, based on the included updated server context.

This summary of the invention does not necessarily describe all features of the invention.

BRIEF DESCRIPTION OF THE DRAWINGS

These and other features of the invention will become more apparent from the following description in which reference is made to the appended drawings wherein.

DETAILED DESCRIPTION OF PREFERRED EMBODIMENTS

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

In this specification and the appended claims, the singular forms "a," "an," and "the" include plural reference unless the context clearly dictates otherwise. Unless defined otherwise, all technical and scientific terms used herein have the same meaning as commonly understood to one of ordinary skill in the art to which this invention belongs.

Figure 1:
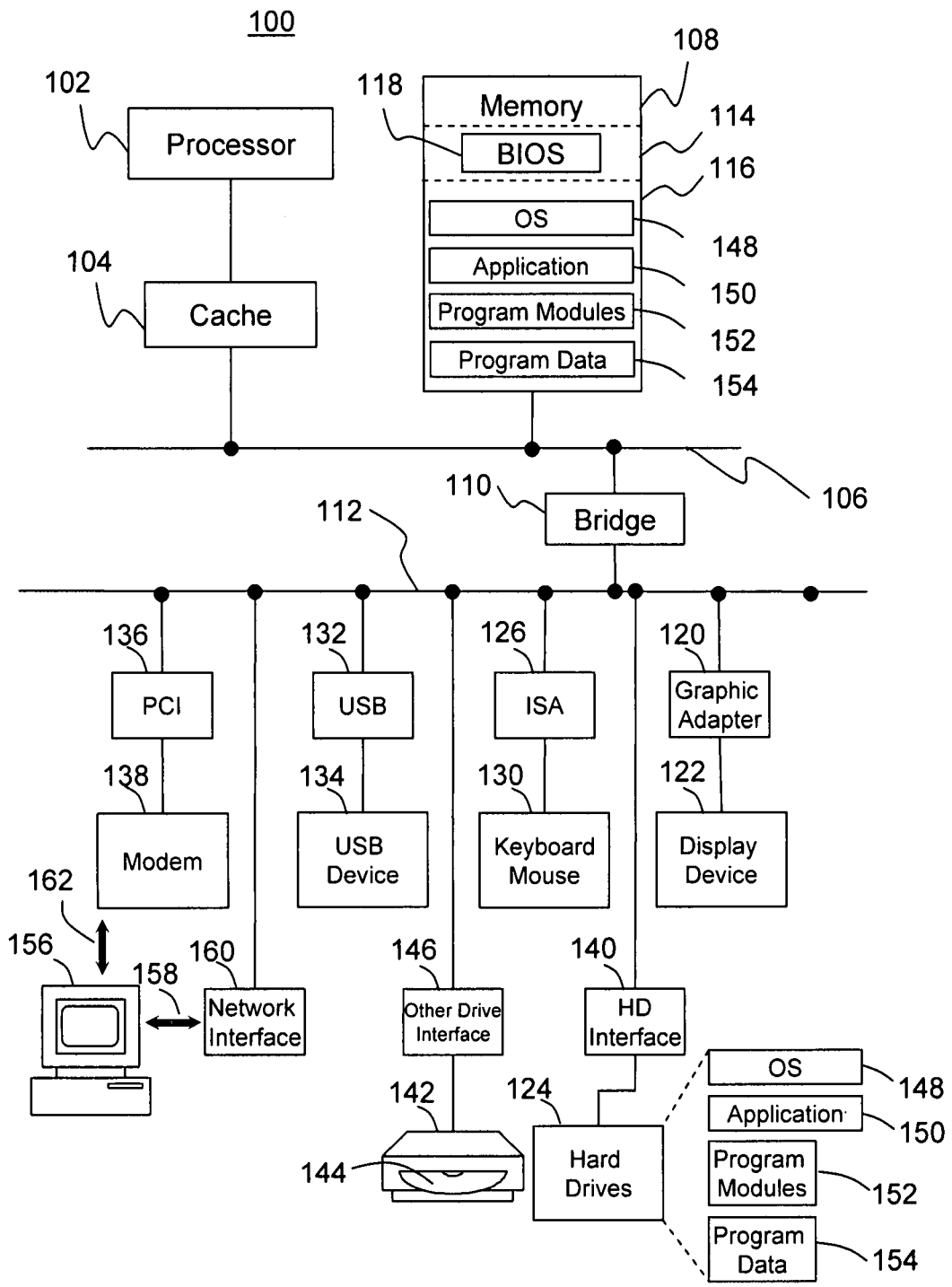
FIG. 1 shows a generic computing environment in which the present invention may be implemented.

FIG. 1 and the following discussion are intended to provide a brief general description FIG. 1 illustrates a block diagram of a suitable computing environment in which a preferred embodiment of the present invention may be implemented.

Those skilled in the art will appreciate that the invention may be practiced with many computer system configurations, including personal computers, hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

Although not required, the invention will be described in the general context of computer-executable instructions, such as program modules, being executed by a personal computer. Generally, program modules include routines, programs, objects, components, data structures and the like that perform particular tasks or implement particular abstract data types.

With reference to FIG. 1 an exemplary system 100 for implementing the invention may be, for example, one of the general purpose computers. The system 100 includes processor 102, which in the exemplary embodiment are each connected to cache memory 104, the cache 104 is connected in turn to a system bus 106 that couples various system components.

Also connected to system bus 106 are a system memory 108 and a host bridge 110. Host bridge 110 connects I/O bus 112 to system bus 106, relaying and/or transforming data transactions from one bus to the other. The system bus 106 and the I/O bus 112 may be any of several types of bus structures including a memory bus or memory controller, a peripheral bus, and a local bus using any of a variety of bus architectures. The system memory includes read-only memory (ROM) 114 and random access memory (RAM) 116. A basic input/output system 118 (BIOS), containing the basic routines that help to transfer information between elements within the personal computer 100, such as during start-up, is stored in ROM 114.

In the exemplary embodiment, the system 100 may further include a graphics adapter 120 connected to I/O bus 112, receiving user interface information for display device 122. A user may enter commands and information into the system 100 through input devices 130 such as a conventional mouse, a key board 130, or the like. Other input devices 134 may include a microphone, joystick, game pad, satellite dish, scanner or the like. The devices may be connected via an Industry Standard Architecture (ISA) bridge 126, or a Universal Serial Bus (USB) bridge 132 to I/O bus 112, respectively. PCI device such as a modem 138 may be connected to the I/O bus 112 via PCI bridge 136.

The exemplary system 100 may further include a hard disk drive 124 for reading from and writing to a hard disk, connected to the I/O bus via a hard disk interface 140, and an optical disk drive 142 for reading from or writing to a removable optical disk 144 such as a CD-ROM or other optical media. The hard disk drive 124, magnetic disk drive 28, and optical disk drive 142 may be connected to the I/O bus 112 by a hard disk drive interface 140, and an optical drive interface 146, respectively. The drives and their associated computer-readable media provide non-volatile storage of computer readable instructions, data structures, program modules and other data for the system 100. Although the exemplary environment described herein employs a hard disk 124 and a removable optical disk 144, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk 124, optical disk 144, ROM 118 or RAM 116, including an operating system 148, one or more application programs 150, other program modules 152 and program data 154.

The exemplary system 100 may operate in a networked environment using logical connections to one or more remote computers, such as a remote computer 156. The remote computer 156 may be another personal computer, a server, a router, a network PC, a peer device or other common network node, and typically includes many or all of the elements described above relative to the exemplary system 100. The logical connections depicted in FIG. 1 include a network 158, for example, a local area network (LAN) or a wide area network (WAN). Such networking environments are commonplace in offices, enterprise-wide computer networks, Intranets and the Internet.

When used in a networking environment, the exemplary system 100 is connected to the local network 158 through a network interface or adapter 160. The exemplary system 100 may use the modem 138 or other means for establishing communications 162 over a wide area network such as the Internet. In a networked environment, program modules depicted relative to the exemplary system 100, or portions thereof, may be stored in the remote memory storage device. It will be appreciated that the network connections shown are exemplary and other means of establishing a communications link between the computers may be used.

The exemplary embodiment shown in FIG. 1 is provided solely for the purposes of explaining the invention and those skilled in the art will recognize that numerous variations are possible, both in form and function. For instance, the exemplary system 100 may also include a magnetic disc drive, and numerous other optional components. All such variations are believed to be within the spirit and scope of the present invention. The exemplary system 100 and the exemplary figures below are provided solely as examples for the purposes of explanation and are not intended to imply architectural limitations. In fact, this method and system can be easily adapted for use on any programmable computer system, or network of systems, on which software applications can be executed.

Figure 2:
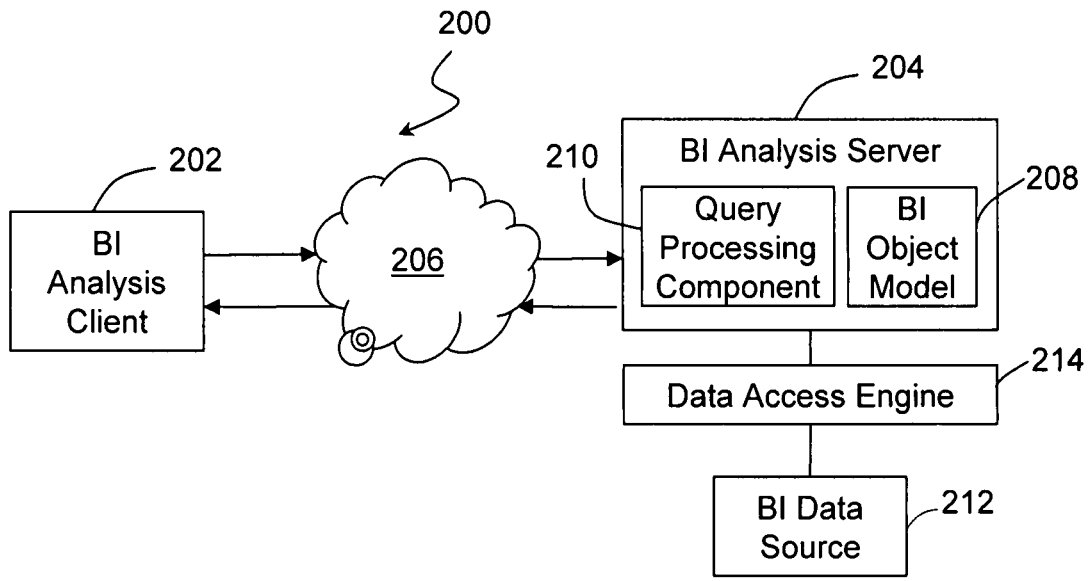
FIG. 2 is a block diagram showing a client-server architecture which performs business intelligence analysis.

FIG. 2 provides an overview of a business intelligence analysis client system 200 in accordance with an embodiment of the invention.

The business intelligence analysis client 202 communicate with a business intelligence analysis server 204 over a computer network 206, such as Internet, an intranet and/or an extranet. The analysis server 204 has a business intelligence object model 208 and a query processing component 210. The object model 208 represents one or more underlying business intelligence data sources 212 storing business intelligence data. The query processing component 210 processes queries received from the analysis client 202 and retrieves requested data from the data sources 212 through the data access engine 214, using the object model 208.

Figure 3:
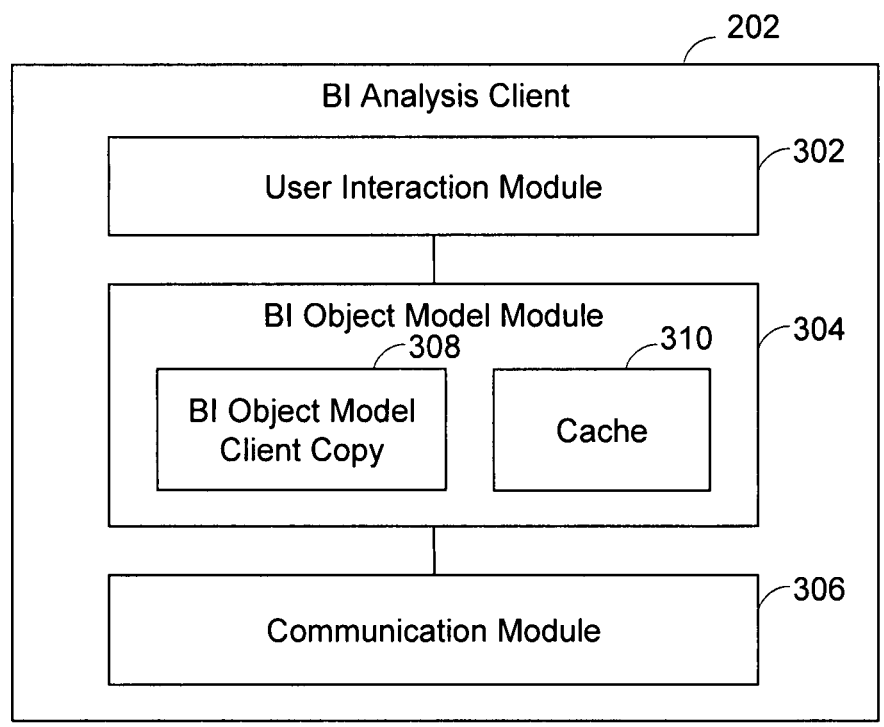
FIG. 3 is a block diagram showing an embodiment of a business intelligence analysis client.

As shown in FIG. 3, the analysis client system 202 has a user interaction module 302, a business intelligence object model module 304 and a communication module 306.

The user interaction module 302 manages user gestures through user interfaces, and converts the user gestures to requests comprising discreet commands for the object model module 304. For example, user gestures may include drilling, expanding or nesting data in a crosstab. The user interaction module 302 also manages the rendering of the business intelligence objects for displaying responses to the user gestures.

The user interaction module 302 typically displays only a portion of the data available within the object model module 308, and may maintain a small copy of this data decorated to support efficient user interface activity.

The object model module 304 has a client copy 308 of the object model 208 of the analysis server 204. The object model client copy 308 stores model objects, which share a common definition with the analysis server 204. The analysis server 204 issues to the analysis client 202 commands to create, delete, replace or update objects in the object model client copy 308. For example, the analysis client 202 requests high level actions of the analysis server 204, such as drilling, expanding or nesting of data, and the analysis server 204 responds with object definitions and commands to modify the objects in the object model client copy 308. Thus, the analysis client 202 and analysis server 204 share a common business intelligence object model.

The object model module 308 may also manage a cache 310 of objects. It may perform intelligent look-ahead behaviour.

The communications module 306 manages requests issued to and responses received from the analysis server 204. The communications module 306 parses responses and directs them to the appropriate objects in the object model client copy 308.

The analysis client 202 and the analysis server 204 communicate in general asynchronously. Thus, the responses from the analysis server 204 arrive asynchronously to the requests issued by the analysis client 202.

By having the object model client copy 308, the analysis client 202 maintains state information of the object model 208, and this information need not be round tripped with each client request and server response. This reduces the amount of information exchanged between the analysis client 202 and the analysis server 204. Furthermore, the analysis server 204 may be stateless, and relying on the state of the queries maintained by the analysis client 202. This is beneficial, for example, in case where the queries from one analysis client are served by a plurality of analysis servers.

Using the object model client copy 308, the analysis client 202 and the analysis server 204 exchange incremental updates to information about the business intelligence object model. The analysis client 202 can build up a collection of information over time that it uses to enhance the client experience.

Thus, the analysis client 202 provides a highly interactive client environment supporting business intelligence analytical gestures with the supporting power of a remote business intelligence analysis server 204.

Figure 4:
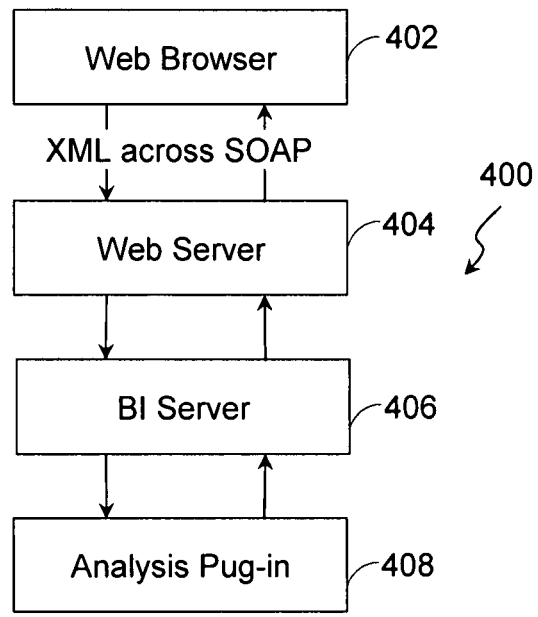
FIG. 4 is a block diagram showing an exemplary business intelligence analysis client-server system.
Figure 5:
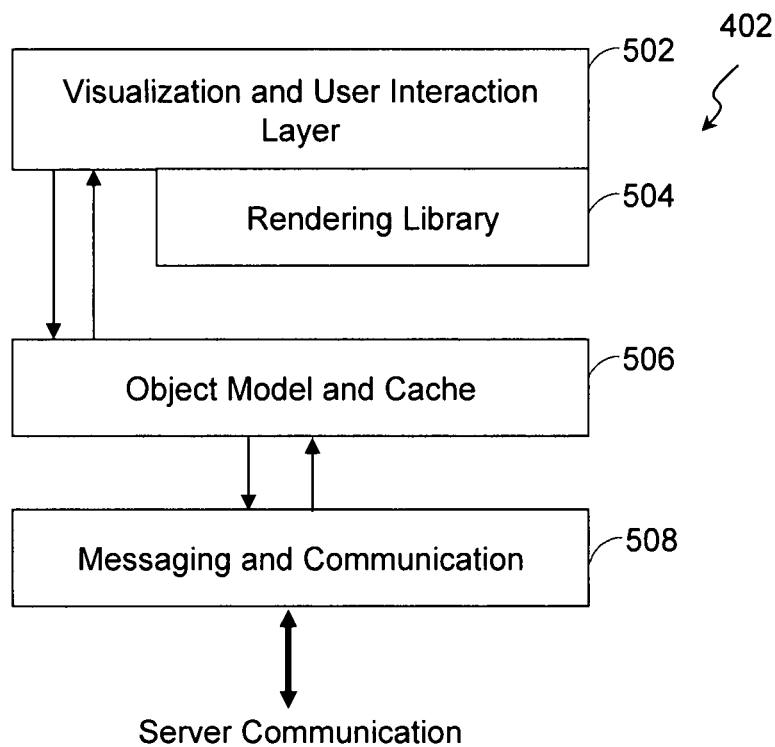
FIG. 5 is a block diagram showing the architecture of the Web browser based client in FIG. 4.

Referring to FIGS. 4 and 5, an exemplary business intelligence analysis client-server system 400 using a Web browser is described. In this embodiment, the analysis client 402 is Web browser based. The Web, browser based client 402 is connected to a Web server 404, which communicate with a business intelligence server 406 over a computer network, such as Internet, an intranet and extranet. The business intelligence server 406 has an analysis plug-in 408 for updating the server copy of the business intelligence object model, processing queries, retrieving data and preparing commands to update the client copy of the common business intelligence object model.

FIG. 5 shows the architecture of the Web browser based client 402. The browser client 402 has a visualization and user interaction module or layer 502, an object model and cache module or layer 506 and a messaging and communication module or layer 508. These layers may provide similar functions as the user interaction module 302, business intelligence object model module 304 and communication module 306 shown in FIG. 3, respectively.

The visualization layer 502 has a rendering library 504 containing rendering elements, such as, menus, toolboxes, and crosstabs.

The browser based client 402 may be written in javascript. The client-server interactions may use Extensible Markup Language (XML). The visualization of objects in the client may use Dynamic HTML (DHTML). The object model and cache layer 506 stores and manages the classes of objects, such as DataMatrix, MetadataSet, and FilterSet, which share a common definition with the business intelligence server 406.

The communications layer 508 manages Simple Object Access Protocol (SOAP) requests issued to and received from the business intelligence server analysis plug-in 408 via the Web server 404.

An example of the process flow between the components of the Web browser based client 402 and the business intelligence server 406 and analysis plug-in 408 is now described.

The visualization and user interaction layer 502 of the browser client 402 captures the user gestures. These gestures are converted to function calls into the object model layer 506. Depending on the gesture, the visualization layer 502 may put itself into a wait state and display appropriate feedback to the user indicating that a request is in progress.

The object model layer 506 then takes the function call and converts this to a business intelligence request to the web server 404. This request is formulated as an XML document and handed to the communication layer 508.

The communication layer 508 takes the XML document, wraps this into a SOAP request package, and then issues an HyperText Transfer Protocol (HTTP) request to the Web server 404 with this SOAP package. The communication layer 508 asynchronously monitors the progress of the request.

The Web server 404 sends the HTTP request to the business intelligence server 406 through the computer network.

The business intelligence server 406 receives the request and hands it to the analysis plug-in 408. The analysis plug-in 408 processes the request, queries the database as required, and creates an XML document containing the response. The XML document result describes updates to the common object model that is shared between the browser client 402 and the business intelligence server 406. FIG. 3 shows the path that the XML document takes to return from the analysis plug-in to the client. The details of an exemplary result document is described in co-pending U.S. application Ser. No. 11/473,915, "System and Method for Delivering Business Intelligence Data in a Client/Server Architecture", which is hereby incorporated by reference in its entirety. Because the browser client 402 allows incremental updates to the model in the object model layer 506, the complete model itself is not exchanged on each request, but only those pieces that are needed or changed.

The communication layer 205 of the browser client 402 receives the HTTP response containing the SOAP response which includes the XML document describing the updates to the model in the object model layer 506. The communication layer 508 hands the XML document to the object model layer 506.

The object model layer 506 processes the XML response and updates the client or local copy of the model in the object model layer 506 with the changes identified by the business intelligence server analysis plug-in 408. The object model layer 506 notifies the visualization layer 502 about the changes to the objects of the model in the object model layer 506. The visualization layer 502 then completes the request pending state, and retrieves the new information from the object layer 506 and then updates the display, e.g., a tree and crosstab, with the new information retrieved from the server as stored in the object layer 506 of the browser client 402.

Some requests may be handled by the object model layer 506 if they can be satisfied by the data stored in the object model cache 506. If the request cannot be satisfied by the object model layer 506, the request is sent to the business intelligence server 406.

The browser client 402 and the business intelligence server 406 are based on a client-server application program interface (API). The client-server API reflects well-defined separation of responsibilities between the browser client 402 and the business intelligence server 406. The API comprises a set of XML requests from the browser client 402 to the business intelligence server 406. In addition, there is a set of responses returned from the business intelligence server 406 to the browser client 402. The browser client 402 assumes that the responses are received asynchronously and that, from the client perspective, the responses are independent of the request.

Figure 6:
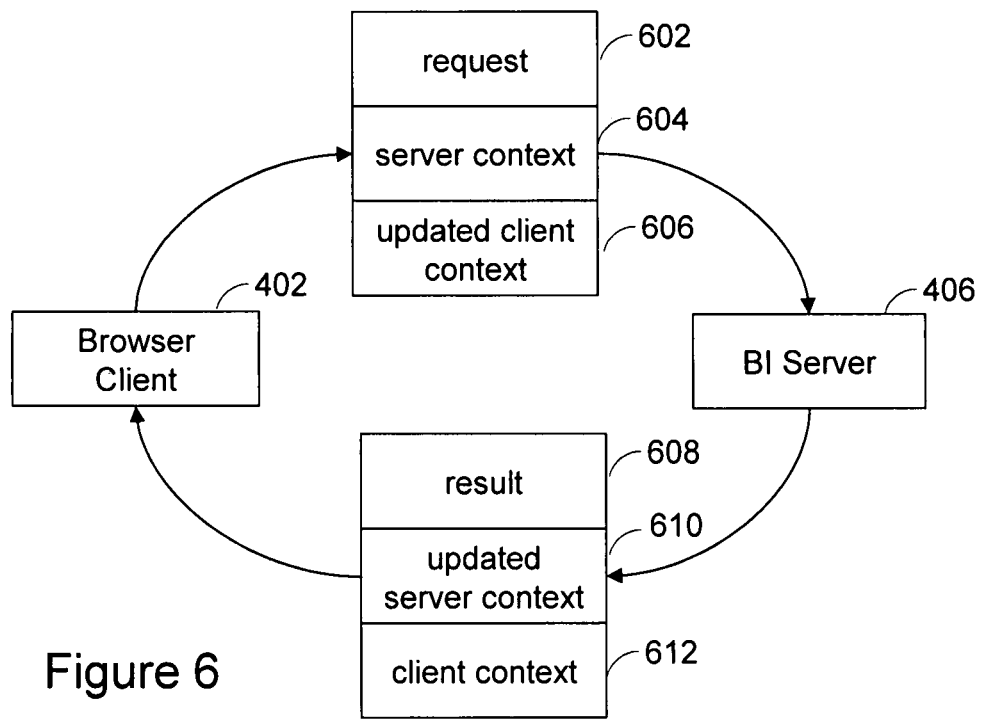
FIG. 6 is a diagram showing information exchange between a client and a server.

Referring to FIG. 6, the browser client 402 submits requests for information and then asynchronously receives a result from the business intelligence server 406.

The client requests submitted to the business intelligence server 406 has three portions: a request 602, a server context 604, and an updated client context 606. The request, the server context, and the client context are described in co-pending U.S. application Ser. No. 11/473,915, "System and Method for Delivering Business Intelligence Data in a Client/Server Architecture", which is hereby incorporated by reference in its entirety.

The server context is supplied to the browser client 402 with the result of a client request by the business intelligence server 406. This server context is then sent back to the business intelligence server 406 on subsequent requests. The server context is a portion of well-formed XML that is treated as a black box by the browser client 402.

The server context is a shapshot picture of the view of object state represented by combining the previous action submitted to the business intelligence server 406 and the previous server state. The context is contained within the <serverstate> element. The browser client 402 does not modify any contents of the <serverstate> element, but returns it as-is to the business intelligence server 406 on the subsequent request. Element serverstate has children: datamatrix, filterset, metadata, chart, versioninfo, and analysis. This is the root element for the analysis server context. This information is returned to the client by the server. It is the client's responsibility to send this back with each request to the server. It is interpreted by the server only. It may be completely replaced on the client with each request.

The client context is a portion of well-formed XML supplied to the business intelligence server 406 in a request that will be returned to the browser client 402 with the request result. From the server's perspective, this XML can be seen as a black box.

The business intelligence server 406 receives requests for information or action from the browser client 402. After it has completed the action, or after it has partially finished the action, the business intelligence server 406 returns a result 608 to the browser client 402. The result 608 may include an indication to the browser client 402 that the result is only partial and that subsequent information is available.

Responses returned from the business intelligence server 406 have three portions: a result 608, an updated server context 610, and a client context 612. The result, the server context, and the client context are described in co-pending U.S. application Ser. No. 11/473,915, "System and Method for Delivering Business Intelligence Data in a Client/Server Architecture", which is hereby incorporated by reference in its entirety.

The client context 612 is returned from the business intelligence server 406 exactly as the updated client context 606 was supplied from the browser client 402 in the request.

The server context 604, 610 is managed by the business intelligence server 406 and supplied to the browser client 402 in the result. The browser client 402 roundtrips the latest server context with each request.

The business intelligence analysis activity typically involves the creation and manipulation of a cross-tabular (also called "crosstab") and/or graphical presentation of the data. A "set expression" represents a collection of members from the same hierarchy of a dimension. A "block" represents a visualization of a set expression. Set expressions may be further broken down into "segments" that are non-intersecting portions of the collection of members represented by the set expression.

Members of a data set to be analysed may be segmented into different segments for displaying on a crosstab. In a simplified example shown in FIG. 7, filters or rules may be applied to the data set 700. The segment containing members of interest are considered to be the Included segment 702, which may be further separated into Visible segment 704 and Remainder segment 706. Remainder segment 706 may include members of lesser interest, which may be encapsulated into a single member. Members of the data set that are of no interest for the current analysis is in an Excluded segment 708. A user may control how many members are in the Visible segment 704. Usually there is also a Summary segment 710.

Figure 7:
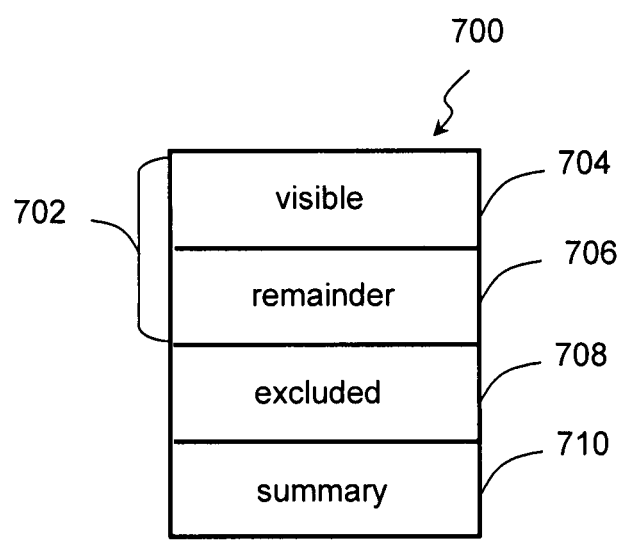
FIG. 7 shows member segments of a data set.

FIG. 7 shows a simplified example for segmenting a data set. Report management systems in general, and large report management systems based on Online Analytic Processing (OLAP) concepts and technology in particular, perform filtering, segmentation and presentation of the data set. A data item may be used which includes a name, and an expression for the filtering, segmentation and presentation. Such a report managing system may comprise a segment manager, an interest degree manager, a representation manager, a data manager and a display manager. Examples of data items and the generation thereof and the report managing system are described in co-pending U.S. application Ser. No. 11/473,913, titled "System and Method for Managing Large OLAP In An Analytical Context", which is hereby incorporated by reference in its entirety.

Figure 8:
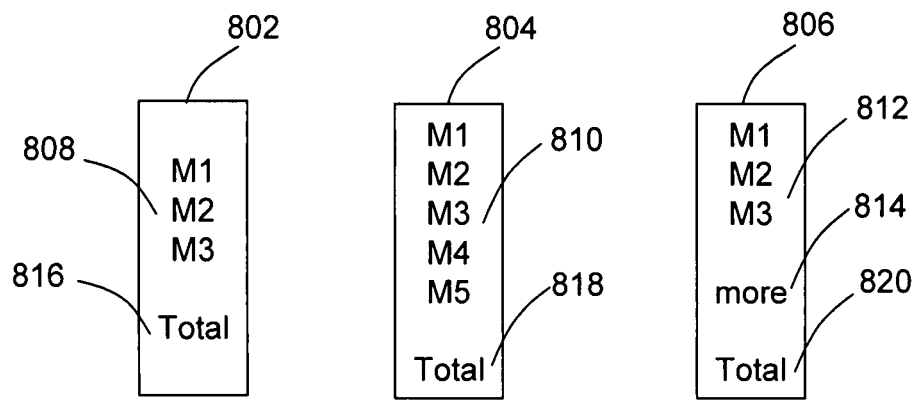
FIG. 8 shows examples of expression set results.

FIG. 8 shows an example where the number of Visible members is set to a guideline rather than an absolute setting, for example, "3 plus or minus 2", where an expression based set, for example, "children (member)" yields a set of members, possible outcomes include 802 for three child-members; 804 for five child-members; and 806 for 100 child-members. The Visible items 808, 810, 812, are the individual child-members that are shown in a crosstab. If there exists two more child-members than the specified maximum of three items, all five items may be shown 804. If there are 100 child-members 806, then the remainder is sown in a "more" segment. There may be a Summary segment in the for of "Total" 816, 818 and 820.

The number of members returned in an expression-base set is generally unknown in advance. This results in the disadvantage that data items that represent the visible and remainder segments are complex, because they must yield an appropriate result for each of the examples illustrated in FIG. 8. A data item provides the query view of a segment. Each data item name contains information that identifies the block and segment. For example:

block:00000fa445bfc97400000035 tag:orderfilter use:dm.

There are 3 parts to this example. The first part (block:xxxx) identifies the block through a unique identifier. The second part (tag:yyyyy) identifies the segment of the block and the third portion (use:dm) identifies the usage of the data item; in this case, the data item is being used to generate a data matrix. A typical visible segment expression for the examples in FIG. 8 is as follows:

_firstFromSet([baseExpression],3,2)

The _firstFromSet function is an expensive function that acts as a macro and may be expanded to:

HEAD([baseExpression], if (CountSetAll(HEAD
  ([baseExpression],max+overflow+1))>max+
  overflow) then (max) else (max+overflow))

In this case, the macro would result in:

HEAD([baseExpression], if (CountSetAll(HEAD
  ([baseExpression],3+2+1))>3+2) then (3) else
  (3+2))

A typical remainder segment expression appears as follows:

_remainderSet([remainderCalc],[baseExpression],
  max)

The _remainderSet function is an expensive function that acts as a macro and may be expanded to:

HEAD(set([remainderCalc]), if (CountSetAll(HEAD
  ([baseExpression],max+1))>max) then (1) else
  (0))

In the examples illustrated in FIG. 8, this would become:

HEAD(set([remainderCalc]), if (CountSetAll(HEAD
  ([baseExpression],3+1))>3) then (1) else (0))

In the above example, HEAD is a function which limits the presented items to the first n number of the set. The base Expression provides all members in a set.

Figure 9:
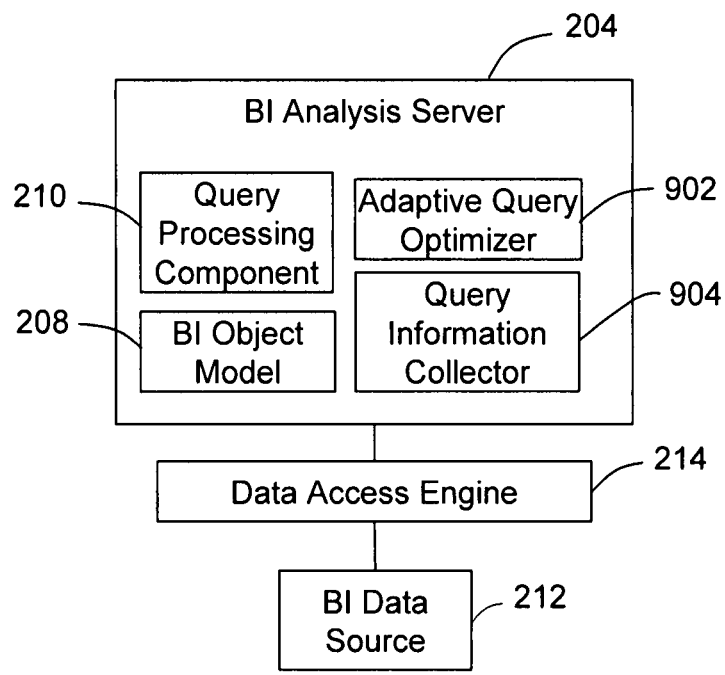
FIG. 9 is a block diagram showing a business intelligence analysis client with an adaptive query optimizer.

Referring to FIG. 9, in accordance with one embodiment of the present invention, there is provided an adaptive query optimizer 902 and a query information collector 904 within the BI analysis server 204.

Figure 10:
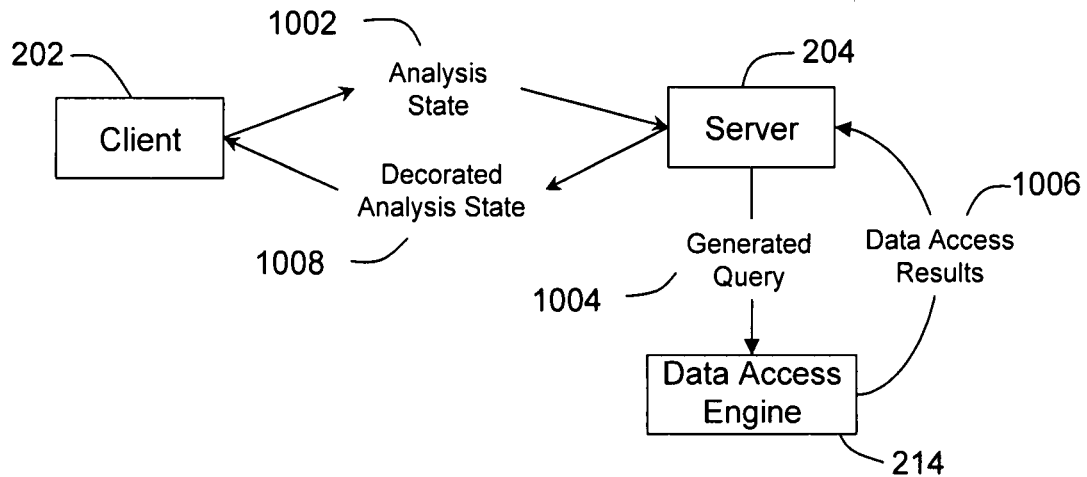
FIG. 10 is a diagram of request/result round trip between client and server.

Referring also to FIG. 10, client 202 sends a request to server 204 with analysis state 1002 including an updated client context and a current server context. The server 204 generates a query 1004 based on the request received. The server 204 then retrieves data access results 1006 through the data access engine 214. These results are processed and in addition to normal results (such as rows and columns), the query information collector 904 in the server 204 also captures information useful for future optimization such as actual result set size, maximum result set size and accuracy of captured information, and adds this information to the server context. Client 202 then accepts the response from the server including the updated server context and renders the view, for example a crosstab or a chart.

An example of a typical server context is as follows:

```
<ss>
    <versioninfo>
        <versionnumber ver="1"/>
    </versioninfo>
    <analysis annotation="" displayallitemsexpand="false" displaydataupdatedon="false"
displayfilter="true" displayfilterposition="begin" displayoutermostgroupsonrows="false"
displaysection="" displaysections="false" displaysetsonrows="false"
elcid="uuid:000006c445c0c1fb00000002" filteraggregateenabled="false"
horizontalPagination="false" paperorientation="portrait" papersize="default"
passedfilteraggregateenabled="true" remainderenabled="true" remaindermode="null"
reporttemplate="" subtitle="" subtotalenabled="false" summaryenabled="true" title=""
treatzerosasnullsforsuppression="false" usereporttemplate="false" visibleenabled="true">
        <format/>
        <calcdef calcspectype="1" calctype="1"
elcid="uuid:000006c445c0c1fb00000003"/>
        <calcdef calcspectype="2" calctype="1"
elcid="uuid:000006c445c0c1fb00000004"/>
        <calcdef calcspectype="3" calctype="1"
elcid="uuid:000006c445c0c1fb00000005"/>
        <calcdef calcspectype="4" calctype="1"
elcid="uuid:000006c445c0c1fb00000006"/>
        <calcdef calcspectype="5" calctype="1"
elcid="uuid:000006c445c0c1fb00000007"/>
        <calcpool>
            <calc blockptr="uuid:000006c445c0c20300000020"
calcdefptr="uuid:000006c445c0c1fb00000003" description="More & hidden"
elcid="uuid:000006c445c0c20300000021" isvalid="true" name="More & hidden"
type="special"/>
            <calc blockptr="uuid:000006c445c0c20300000020"
calcdefptr="uuid:000006c445c0c1fb00000004" description="Subtotal"
elcid="uuid:000006c445c0c20300000022" isvalid="true" name="Subtotal" type="special"/>
            <calc blockptr="uuid:000006c445c0c20300000020"
```

-continued

```
calcdefptr="uuid:000006c445c0c1fb00000005" description="Subtotal (excluded)"
elcid="uuid:000006c445c0c20300000023" isvalid="true" name="Subtotal (excluded)"
type="special"/>
        <calc blockptr="uuid:000006c445c0c20300000020"
calcdefptr="uuid:000006c445c0c1fb00000006" description="Subtotal (included)"
elcid="uuid:000006c445c0c20300000024" isvalid="true" name="Subtotal (included)"
type="special"/>
    </calcpool>
    <block aggregate="unknown" annotation="" blocksize="0"
elcid="uuid:000006c445c0c20300000020" filteraggregateenabled="false"
hierarchyenabled="false" lockenabled="false" name="" passedfilteraggregateenabled="true"
remainderenabled="true" remaindermode="null" subtotalenabled="false"
summaryenabled="true" type="children" visibleenabled="true">
        <memberlist>
            <axisexprmember>
                <memberptr>mun:[orders].[All Time].[All Time].[All
Time]->:[PC].[@MEMBER].[All Time]</memberptr>
            </axisexprmember>
        </memberlist>
        <calcptr>uuid:000006c445c0c20300000021</calcptr>
        <calcptr>uuid:000006c445c0c20300000022</calcptr>
        <calcptr>uuid:000006c445c0c20300000023</calcptr>
        <calcptr>uuid:000006c445c0c20300000024</calcptr>
        <blocksort/>
    </block>
</analysis>
<metadata authorLocale="en" cubename="" decSep="." defblocksize="12"
defexpandsize="20" elcid="uuid:000006c445c0c1fb0000000e"
inaccessibleMemberSubstitution="true" listSep="," maxblocksize="9999"
maxexpandsize="50" membersRollup="false" membersmaytwinkle="true" modelref=""
modelsearchpath="/content/package[@name='orders']/model[@name='model
']" originaldefblocksize="12">
    <dataSources>
        <dataSource name="orders">
            <cubeProperty name="cubeDataUpdatedOn">2003-06-
11T10:42:05.0000</cubeProperty>
        </dataSource>
    </dataSources>
</metadata>
<filterset elcid="uuid:000006c445c0c1fb0000000f"
metadataptr="uuid:000006c445c0c1fb0000000e"/>
<datamatrix aggregate="unknown" datamode="full"
elcid="uuid:000006c445c0c1fb00000012" filtersetptr="uuid:000006c445c0c1fb0000000f"
metadataptr="uuid:000006c445c0c1fb0000000e">
    <axis cansuppress="true" elcid="uuid:000006c445c0c1fb00000010"
name="rowEdge"/>
    <axis cansuppress="true" elcid="uuid:000006c445c0c1fb00000011"
name="columnEdge">
        <axisexpr>
            <block elcid="uuid:000006c445c0c20300000020"/>
        </axisexpr>
    </axis>
</datamatrix>
<crosstab coleodpagenum="0" colpagenum="0" colpagesize="50"
datamatrixptr="uuid:000006c445c0c1fb00000012" elcid="uuid:000006c445c0c1fb00000014"
roweodpagenum="-1" rowpagenum="0" rowpagesize="200" visible="true"/>
<worksheet elcid="uuid:000006c445c0c1fb00000013"
metadataptr="uuid:000006c445c0c1fb0000000e"/>
</ss>
```

An example of the additional information for adaptive querying for the previous example would see the following information appended to the analysis object:

```
<queryoptinfo>
    <queryoptblockinfo blockptr="uuid:000010b845c0c2c30000000c"
queryoptactualmembercount="3" queryoptmaxmembercount="3"
queryoptminmembercount="3"/>
</queryoptinfo>
```

As members are retrieved by the server from the data access engine, the adaptive query optimizer 902 tags the members in the result set as to which data item they belong to. This in turn corresponds to the block and segment within the block, that they belong to. The adaptive query optimizer 902 of the server 204 is therefore able to determine as each member is returned, to which distinct segment of the block the member belongs. The adaptive query optimizer 902 of the server 204 generally assumes that each unique member will only appear once in a result set instance.

Subsequently, when the client 202 issues the next request to the server based on a user gesture, the server 204 constructs a query for the new crosstab or a chart. A user gesture typically does not change the entire crosstab, but only parts of the crosstab. Based on this fact, the adaptive query optimizer 902 in the server 204 can predict, using information stored in the server context from the previous query, what the results of some portions of the query will be; specifically those parts that have remained unchanged from previous crosstab results. This information is used to provide a query that is more optimal than a query which does not have the fore-knowledge of the outcome of parts of the query results.

The adaptive query optimization in accordance with one embodiment of the present invention uses a query information collector 904 to collect the information needed to perform the optimization.

Business intelligence analysis system in accordance with one embodiment of the present invention queries information conditionally based on the size of the result set. A query according to the embodiment of the invention, therefore, incorporates both the size test and two different result sets, one for a large result set and one for a small result set. In accordance with one embodiment of the present invention, the business intelligence analysis server can predict what the result set size will be and utilize a more efficient query in either the large result set case or the small result set case. Typical performance improvements are in the 20% range.

Figure 11:
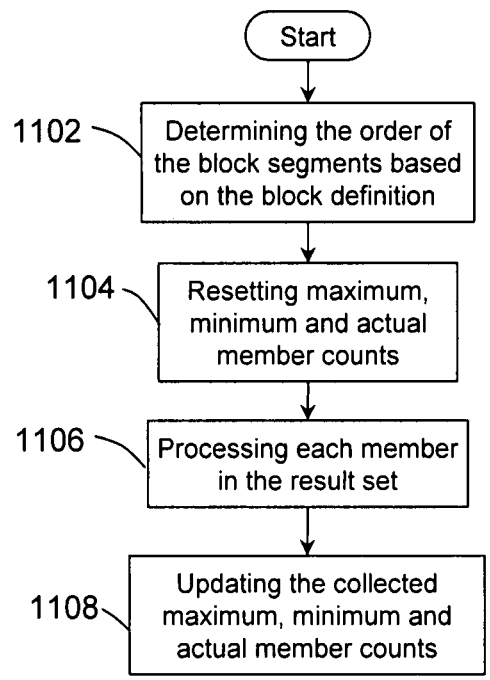
FIG. 11 is a diagram showing the preparation of a response by a server in accordance with one embodiment of the present invention.

In this embodiment, information collected may include:
Minimum member count of each block
Maximum member count of each block
Actual member count of each block Referring to FIG. 11, the method to collect the information used in the adaptive query optimization is described. The query information collector 904 determines the order of the block segments appearing in the result set based on the block definition 1102. The default order may be visible members, combined with calculated members, followed by the remainder segment followed by the block summary segment. At step 1104, a count is reset and maintained for the minimum, maximum and actual member count for each block. As each member is processed 1106, the counts are incremented accordingly 1108.

Figure 12:
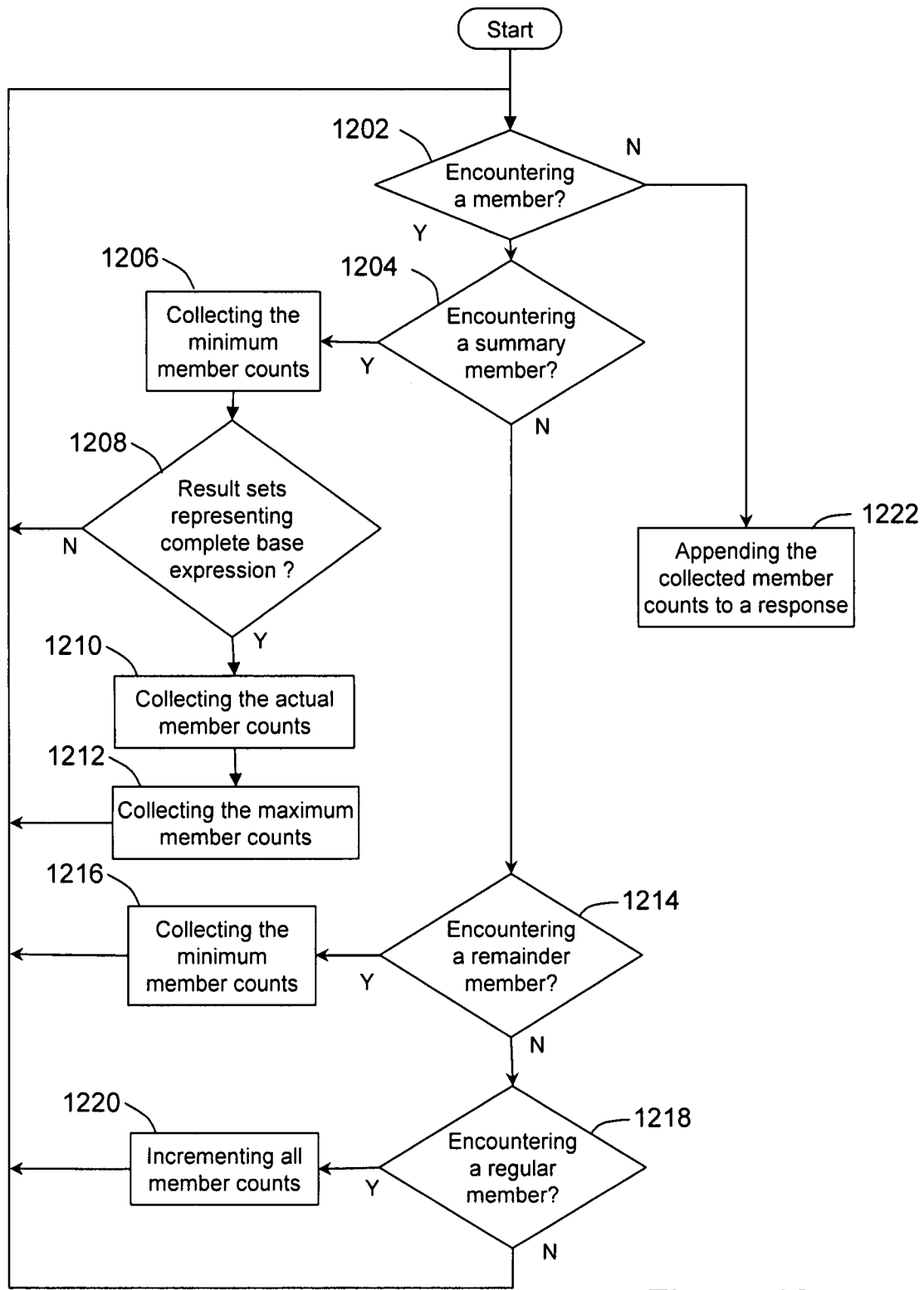
FIG. 12 is a diagram showing the details of the preparation of a response for an individual block by a server in accordance with one embodiment of the present invention.

Referring to FIG. 12, the steps of processing a block is described. As each member or calculated member is processed in the result set, it is handed to the query information collector 904 for processing. If a member is encountered 1202, and the member is a summary member 1204, the minimum member counts are collected 1206. If the result sets are deemed to be returning result sets which represent the complete base expression of a block 1208, then the maximum and the actual member counts are collected 1210, 1212. In case of incomplete base expression, the other members of a block will be checked starting again from step 1202. An example of an incomplete base expression represented by the result sets is when the user has requested that only a filtered subset of the complete base set be returned. For example, of the set of all employees return only the top 25 based on sales revenue for 2004. At step 1214, if a summary member is not encountered and a remainder member is encountered then minimum member count is collected 1216, after which other members are processed 1202. If neither a remainder nor a summary are encountered 1214, the member will be checked whether it is a regular member 1218. If it is a regular member, the current member count for the block will be incremented 1220. This member count is then used later in the algorithm as the basis for the minimum, maximum or actual block counts. The process will repeat until no new members are encountered 1222. The captured member count information for each block is then stored in the object model. When the response is being sent to the client, this optimization information is round tripped in an updated server context to the client. Subsequent requests from the client to the stateless server 204 will contain this information in the server context for use in optimization of the queries needed to fulfill this client request.

Figure 13:
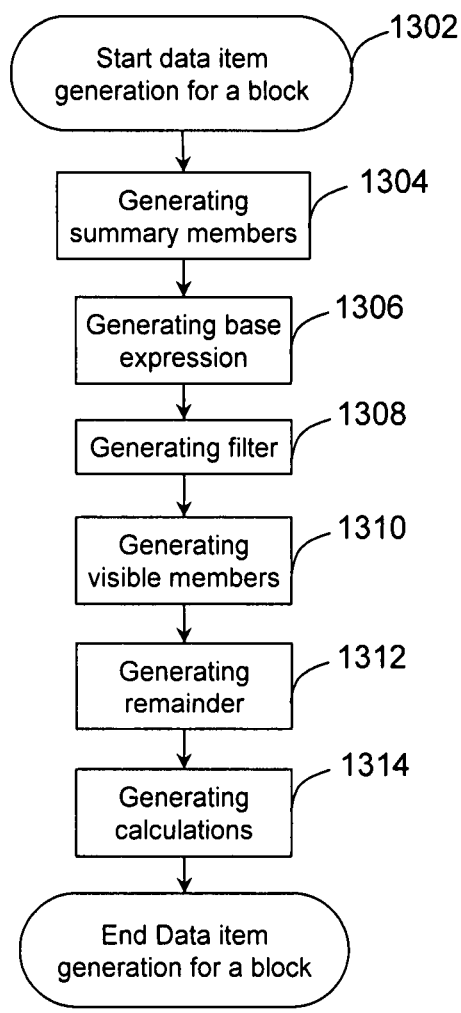
FIG. 13 is a diagram showing an adaptive query optimization at a server upon receiving a request.
Figure 14:
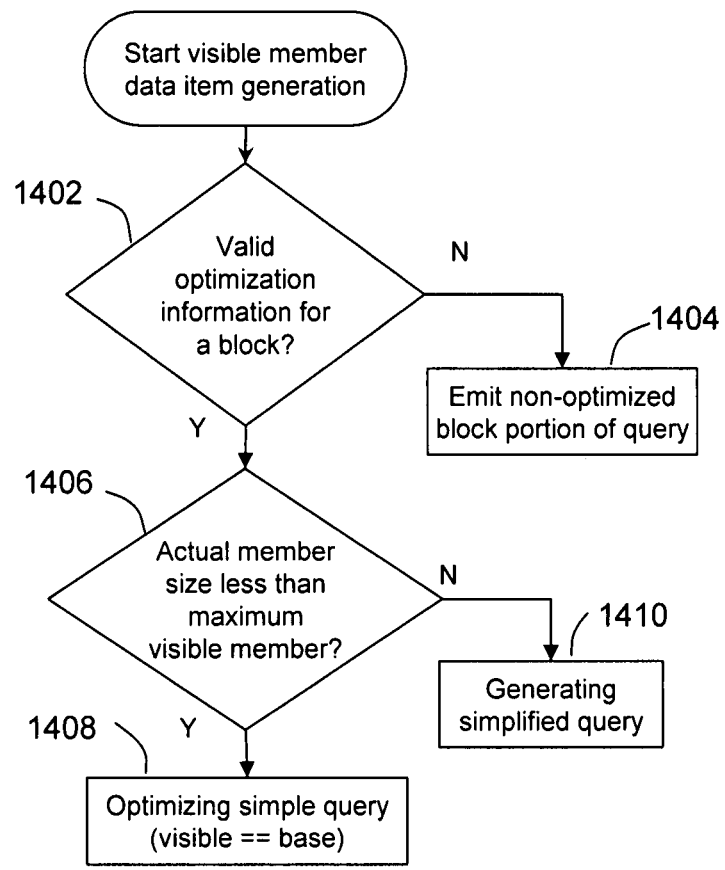
FIG. 14 is a diagram showing a generation of visible member data item upon receiving a request.

FIG. 13 shows the steps of an adaptive query optimization at a server when subsequent requests for information from the client 202 are received at the analysis server 204. The adaptive query optimizer 902 starts the generation of data items for a block 1302 by generating the summary 1304, followed by generating the base expression 1306, the filter 1308, the visible members 1310, generating remainder 1312, generating calculations 1314. Referring to FIG. 14, where the steps for generating visible members 1310 are shown. The adaptive query optimizer 902 verifies if there is valid optimization information for a block 1402. If the optimization information is not valid, the non-optimized portion of query is released 1404. If the optimization information is valid, and if the actual member size is less than the maximum visible member 1406, the simple query is optimized 1408. Otherwise a simplified query is generated 1410.

Figure 15:
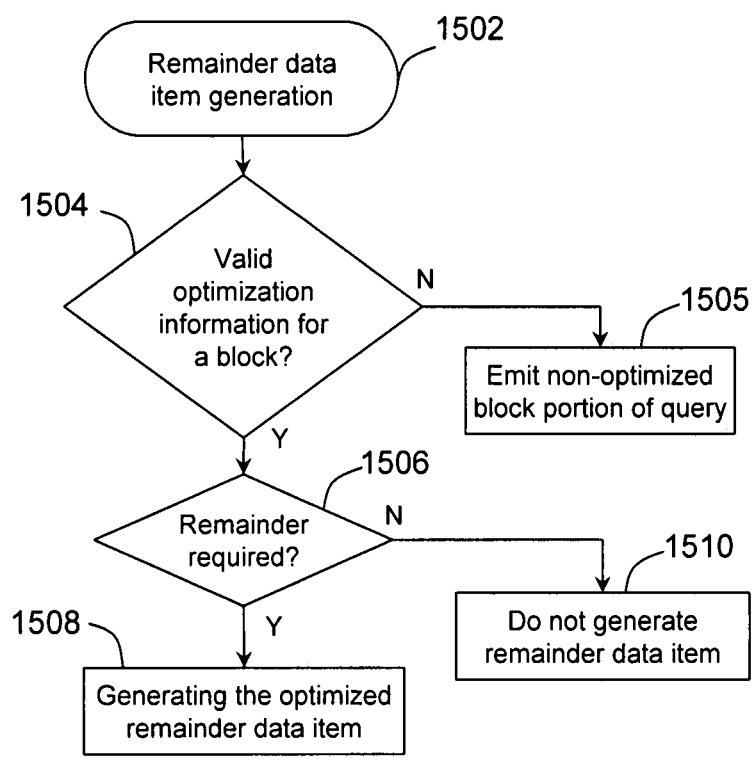
FIG. 15 is a diagram showing a generation of remainder member data item upon receiving a request.

FIG. 15 shows the steps of generating the remainder 1502, at step 1504 it is verified if there is valid optimization information for a block. If the optimization information is not valid, the non-optimized portion of query is released 1505. If yes, and if the remainder is required 1506, the optimized query is generated accordingly 1508. Otherwise no remainder will be generated 1510.

With the adaptive query optimization as described above, the visible segment expression in the example in FIG. 8 can be optimized as follows:
With 3 members
[baseExpression]
With 5 members
[baseExpression]
With 100 members
Head([baseExpression], 3)

Accordingly, the remainder segment expression, with a successful adaptive query optimization, may be optimized as follows:
With 3 members
Dropped from query as not needed
With 5 members
Dropped from query as not needed
With 100 members
[remainderCalc]

RemainderCalc is a calculation which may be expressed in several different ways depending on the settings the user has chosen.

The degree of performance improvement will depend on the complexity of the overall report and the underlying database, but in all circumstances it will run faster than the original unoptimized expression.

The business intelligence analysis client system of the present invention may be implemented by any hardware, software or a combination of hardware and software having the above described functions. The software code, instructions and/or statements, either in its entirety or a part thereof, may be stored in a computer readable memory. Further, a computer data signal representing the software code, instructions and/or statements may be embedded in a carrier wave may be transmitted via a communication network. Such a computer readable memory and a computer data signal and/or its carrier are also within the scope of the present invention, as well as the hardware, software and the combination thereof.

While particular embodiments of the present invention have been shown and described, changes and modifications may be made to such embodiments without departing from the scope of the invention. For example, the elements of the business intelligence analysis client system are described separately, however, two or more elements may be provided as a single element, or one or more elements may be shared with other components in one or more computer systems.

What is claimed is:

1. A business intelligence analysis server in a client-server business intelligence analysis system comprising:
   a processor; and
   a non-transitory computer-readable medium comprising instructions that, when executed by the processor, cause the processor to perform the steps of:
      receiving a request from a client interface in the client-server business intelligence analysis system, wherein the request includes a query to be issued to a data source by the business intelligence analysis server;
      retrieving data from the data source in accordance with the query of the request;
      capturing optimization information from the data retrieved from the data source based on the query, and storing at least part of the retrieved data;
      providing a response to the request, wherein the response includes information defining a server context, wherein the information defining the server context includes the optimization information, and wherein the server context defines object state resulting from the query;
      dispatching the response to the client;
      receiving a subsequent request from the client, the subsequent request including a second query to be issued to the data source by the business intelligence analysis server and the optimization information included in the server context of the response;
      optimizing the second query by modifying the second query using the optimization information included in the server context of the response and the stored at least portion of the retrieved data, and removing information from the subsequent request that is not needed to retrieve data from the data source in accordance with the second query;
      retrieving data from the data source in accordance with the modified second query; and
      dispatching the retrieved data to the client.

2. The business intelligence analysis server as claimed in claim 1, wherein the captured optimization information is captured from information of an expression-defined set of members.

3. The business intelligence analysis server as claimed in claim 2, wherein the updated server context includes a maximum member count, a minimum member count, and an actual member count for the expression-defined set of members, wherein the adaptive query optimizer is configured to set the value of the maximum member count, the minimum member count, and the actual member count from sets of members resulting from execution of one or more previous queries including the query of the request, and wherein the adaptive query optimizer is configured to optimize the subsequent request from the client using the maximum member count, the minimum member count, and the actual member count.

4. The business intelligence analysis server as claimed in claim 2, wherein the server further comprises a business intelligence object model module configured to represent business intelligence data stored in the data source.

5. The business intelligence analysis server as claimed in claim 2, wherein the response to the request is constructed to cause the client to display a crosstab or a chart.

6. The business intelligence analysis server as claimed in claim 2, wherein the response includes a block representing a visualization of the expression-defined set of members, wherein the block includes segments representing non-intersecting portions of the expression-defined set of members, and wherein the block includes a visible segment and a remainder segment.

7. A method of processing a request from a client interface at a business intelligence analysis server, the method comprising:
   receiving, by the business intelligence analysis server, the request, wherein the request includes a query to be issued to a data source by the business intelligence analysis server;
   retrieving, by the business intelligence analysis server, data from the data source in accordance with the query of the request;
   capturing, by the business intelligence analysis server, optimization information from the data retrieved from the data source based on the query, and storing at least part of the retrieved data;
   providing, by the business intelligence analysis server, a response to the request, wherein the response includes information defining a server context, wherein the information defining the server context includes the optimization information, and wherein the server context defines object state resulting from the query;
   dispatching, by the business intelligence analysis server, the response to the client;
   receiving, by the business intelligence analysis server, a subsequent request from the client, the subsequent request including a second query to be issued to the data source by the business intelligence analysis server and the optimization information included in the server context of the response;
   optimizing, by the business intelligence analysis server, the second query included in the subsequent request, wherein optimizing the second query comprises modifying the second query using the optimization information included in the server context of the response and the at least part of the stored retrieved data, and removing information from the second query that is not needed to retrieve data from the data source, as indicated by the optimization information;
   retrieving, by the business intelligence analysis server, data from the data source in accordance with the modified second query; and
   dispatching, by the business intelligence analysis server, the retrieved data to the client.

8. The method as claimed in claim 7, wherein the captured optimization information is captured from information of an expression-defined set of members, wherein the response includes a block representing a visualization of the expression-defined set of members, wherein the block includes segments representing non-intersecting portions of the expression-defined set of members, and wherein the optimization information is segment information of the block.

9. The method as claimed in claim 8, wherein the block has a base expression representing all members in the expression-defined set of members, and further comprising determining the completeness of the base expression in the block.

10. The method as claimed in claim 8, further comprising determining an order of the segments of the block.

11. The method as claimed in claim 8 further comprising determining a maximum member count and a minimum member count of the block.

12. The method as claimed in claim 8 further comprising determining an actual member count of the block.

13. The method as claimed in claim 7 further comprising verifying the applicability of the optimizing information as supplied in the round tripped server context.

14. A non-transitory computer-readable storage medium comprising instructions that, when executed by a processor of a business intelligence server, causes the processor of the business intelligence analysis server to perform the steps of:
   receiving a request from a client interface in the client-server business intelligence analysis system, wherein the request includes a query to be issued to a data source by the business intelligence analysis server;

retrieving data from the data source in accordance with the query of the request;

capturing optimization information from the data retrieved from the data source based on the query, and storing at least part of the retrieved data;

providing a response to the request, wherein the response includes information defining a server context, wherein the information defining the server context includes the optimization information, and wherein the server context defines object state resulting from the query;

dispatching the response to the client;

receiving a subsequent request from the client, the subsequent request including a second query to be issued to the data source by the business intelligence analysis server and the optimization information included in the server context of the response;

optimizing the second query by modifying the second query using the optimization information included in the server context of the response and the stored at least portion of the retrieved data, and removing information from the subsequent request that is not needed to retrieve data from the data source in accordance with the second query;

retrieving data from the data source in accordance with the modified second query; and dispatching the retrieved data to the client.

15. The non-transitory computer-readable storage medium of claim 14, wherein the captured optimization information is captured from information of an expression-defined set of members, wherein the response includes a block representing a visualization of the expression-defined set of members, wherein the block includes segments representing non-intersecting portions of the expression-defined set of members, and wherein the optimization information is segment information of the block.

16. The non-transitory computer-readable storage medium of claim 15, wherein the block has a base expression representing all members in the expression-defined set of members, and further comprising instructions that cause the processor to determine the completeness of the base expression in the block.

17. The non-transitory computer-readable storage medium of claim 15, further comprising instructions that cause the processor to determine an order of the segments of the block.

18. The non-transitory computer-readable storage medium as claimed in claim 15, further comprising instructions that cause the processor to determine a maximum member count and a minimum member count of the block.

19. The non-transitory computer-readable storage medium of claim 15, further comprising instructions that cause the processor to determine an actual member count of the block.

20. The non-transitory computer-readable storage medium of claim 15, further comprising instructions that cause the processor to verify the applicability of the optimizing information as supplied in the round tripped server context.

* * * * *